March 2, 1948.  A. F. TREMBLAY  2,437,214
LEHR FEEDER
Filed May 24, 1943  5 Sheets-Sheet 1
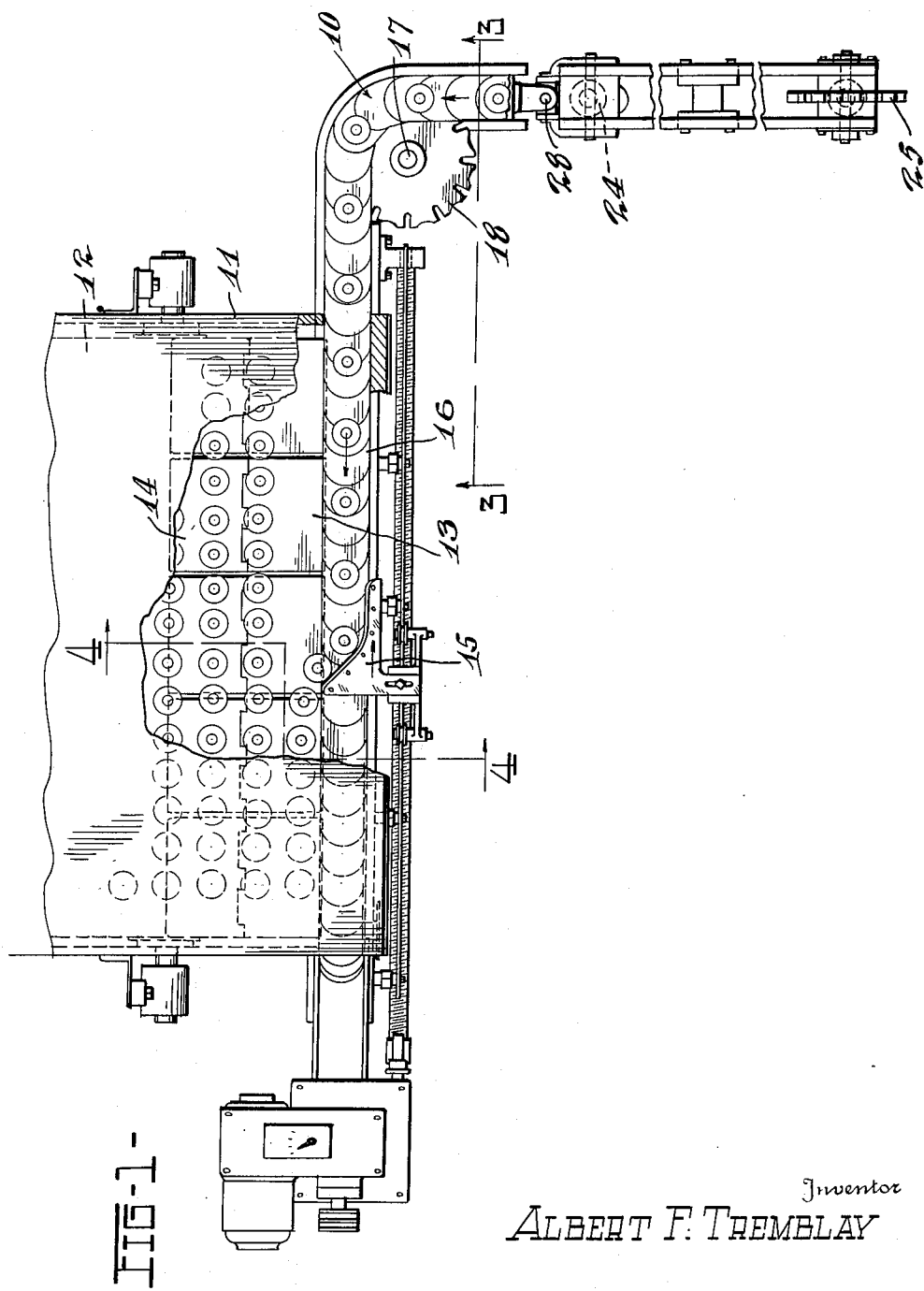
Inventor
ALBERT F. TREMBLAY
By Owen & Owen
Attorneys

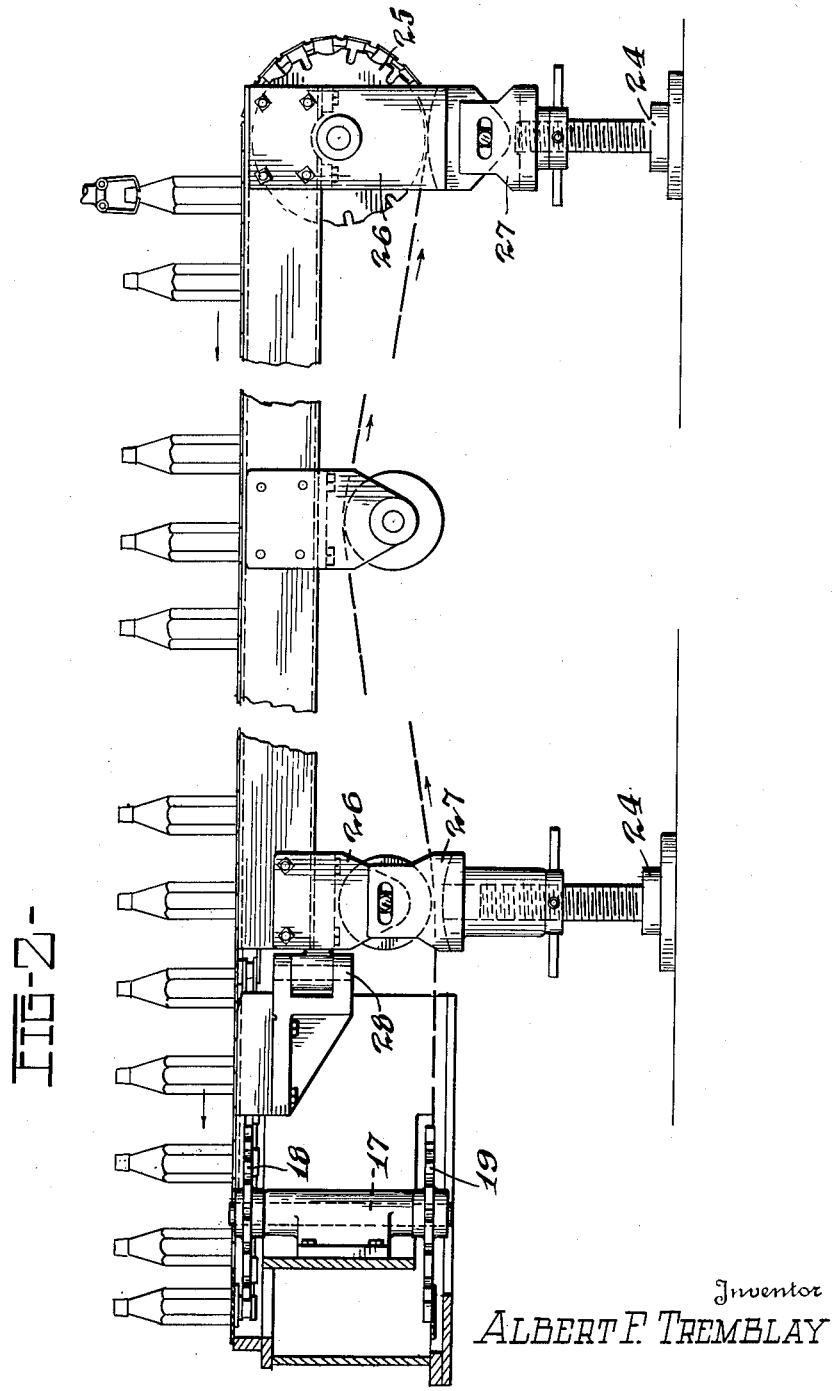

March 2, 1948. A. F. TREMBLAY 2,437,214
LEHR FEEDER
Filed May 24, 1943 5 Sheets-Sheet 3
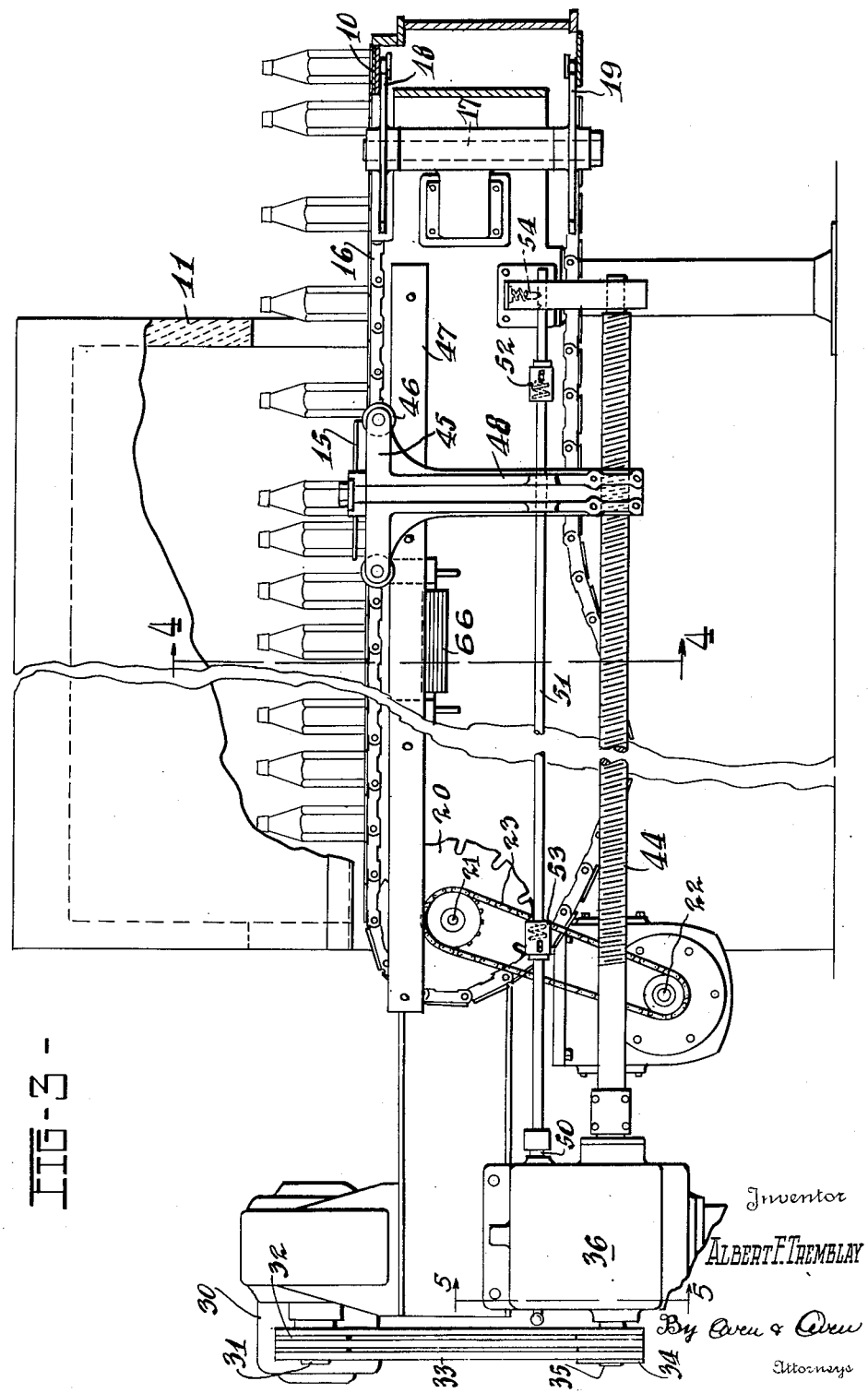
Inventor
ALBERT F. TREMBLAY
By Owen & Owen
Attorneys March 2, 1948.  A. F. TREMBLAY  2,437,214
LEHR FEEDER
Filed May 24, 1943  5 Sheets-Sheet 4

FIG-4-

Inventor
ALBERT F. TREMBLAY
By Owen & Owen
Attorneys

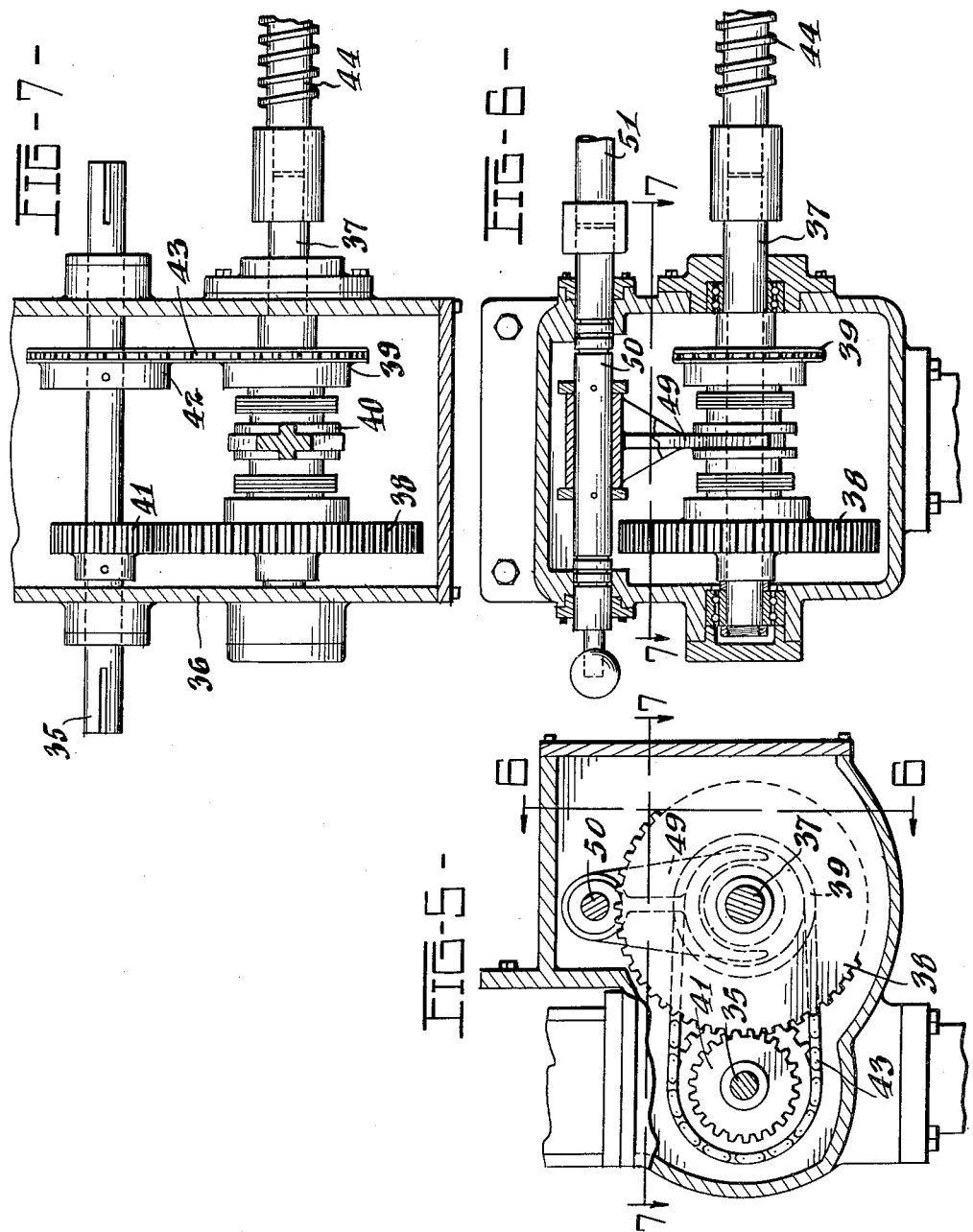

Patented Mar. 2, 1948

2,437,214

UNITED STATES PATENT OFFICE 2,437,214

LEHR FEEDER

Albert F. Tremblay, Toledo, Ohio, assignor to Kent-Owens Machine Company, Toledo, Ohio, a corporation of Ohio Application May 24, 1943, Serial No. 488,162

13 Claims. (Cl. 198—31)

1

This invention relates to the feeding of glass articles to an annealing lehr, and more particularly to conveying bottles or like blown ware from a blowing machine to a lehr and placing them upon a conveyor within the lehr.

The object of the invention is to feed the glass articles to the lehr conveyor and place them thereon with a minimum of breakage of, or injury to, the glass articles.

Newly blown glass articles are customarily released from the mold while still as hot as they can be without injury in handling. If too hot, they are readily scratched or marred by rough contact and become warped or misshapen if handled so as to apply undue stress. If they are too cold, they are readily shattered by rough handling. For these reasons, such articles must be handled with unusual care.

Various lehr feeders have been devised, but the injury to glassware incident to their use has been such that hand work is still employed in many plants to convey the blown ware from the blowing machine and feed it to the lehr.

The present invention comprises conveying blown ware from the blowing machine to a position adjacent the lehr conveyor by means of an endless chain conveyor with universal joints whereby its path may be varied in any desired direction without the necessity for transferring the ware from one conveyor to another, and executing the necessary transfer from said endless conveyor to the lehr conveyor by means of a special vibrating conveyor.

Details and further objects of the invention will appear as the description proceeds.

In the accompanying drawings, forming a part of this specification,

Figure 1 is a plan view of apparatus embodying one form of the invention, parts of the lehr being broken away to show the relation of the conveyors;

Fig. 2 is an elevation of the receiving end of the carrying-in conveyor;

Fig. 3 is an end view of the lehr and associated conveying mechanism, partly in section along the line 3—3 of Fig. 1;

Fig. 4 is a partial longitudinal section of the receiving end of the lehr approximately on the line 4—4 of Figs. 1 and 3;

Fig. 5 is a section on the line 5—5 of Fig. 3;

Fig. 6 is a section on the line 6—6 of Fig. 5;

Fig. 7 is a section on the line 7—7 of Figs. 5 and 6.

The embodiment of the invention disclosed in the drawings comprises an endless chain carrying-in conveyor 10 having universal joints between its links, a lehr 11 having therein a common type of endless carrier 12, a vibrating conveyor plate 13 with a hinged lip 14 for placing ware on the conveyor 12, and a wiper 15 for pushing the ware from the carrying-in conveyor 10 to the transfer conveyor 13, which is preferably made in a plurality of sections.

The carrying-in conveyor 10 is composed of links 16 connected by universal joints, which may be substantially like those shown in Patent No. 1,424,850, issued August 8, 1922, to Benjamin H. Purcell, for a Universal carrier chain, or of any other equivalent construction. Viewing the lehr from the entrance end, as in Fig. 3, there is at the right a vertical shaft 17 having thereon an upper sprocket wheel 18 and a lower sprocket wheel 19, one or both of the sprockets being rotatable with respect to the shaft, so that they may rotate in opposite directions. Conveyor 10 changes direction in a horizontal plane about these sprockets.

At the left, there is a drive sprocket 20 for the chain upon horizontal shaft 21, which is driven from a drive shaft 22 by means of a drive chain 23.

The receiving end of the carrying-in conveyor, as shown in Fig. 2, is supported upon vertically adjustable standards 24, the one at the receiving end being provided with a sprocket 25 about which the conveyor turns to start its upper run. Slide ways 26 and 27 are provided on each standard so as to guide the upper and lower runs of the conveyor and support the upper run. The standard at the receiving end is adjusted to the proper height to best receive the ware from the blowing machine. Preferably the other standards are so adjusted that the run is approximately horizontal at the receiving point, and so that there is no change in the angle of the upper run of the conveyor so abrupt as to endanger the upright position of the ware thereon. The entire receiving end may be swung horizontally about a pivot 28 on the bracket carrying sprockets 18 and 19.

The drive of wiper 15 is effected in the following manner:

Motor 30 drives shaft 31 through suitable change-speed gearing. A pulley 32 on shaft 31 drives a belt 33, which in turn drives pulley 34 and shaft 35 extending into gear box 36. Within the gear box there is a countershaft 37 having a gear 38 and a sprocket 39 loose thereon, and a clutch member 40 splined thereon and shiftable longitudinally of the shaft to engage the gear or sprocket alternatively. There are on shaft 35 a gear 41 meshing with gear 38 and a sprocket wheel 42 which drives sprocket wheel 39 by means of a chain 43.

Coupled to and forming an extension of shaft 37 there is a screw 44. Wiper 15 is mounted upon a carrier 45 provided with wheels 46 which run upon track 47. A bracket 48 extends downward from carrier 45 and has screw 44 threaded therethrough, so that the turning of the screw moves the wiper along its track.

The clutch member 40 is operated by a fork 49 operated by a rod 50 through an extension 51 which passes through bracket 48. Extension 51 has thereon a spring bumper 52 engaged by bracket 48 when it reaches the right limit of its travel, as viewed in Fig. 3, and a similar bumper 53 engaged when the bracket reaches its left limit. Suitable means is provided at 54 to yieldingly retain extension 51 in either of its clutch-closing positions, so that it will resist the tendency of the bumper to move it until the bumper spring is compressed sufficiently to move the rod to its other clutch-closing position when means 54 finally yields. The bumpers are adjustable lengthwise of rod 51 so that the travel of the wiper may be stopped at any chosen point in either direction.

The driving gears and sprockets are so proportioned that the wiper moves at the same speed as conveyor 10 on its idle stroke, but slower on its working stroke, so that ware spaced apart on the conveyor 10 are closer together on plate 13.

The lehr carrier shown is composed of conventional links 60 passing around sprocket wheel 61 at the entrance end of the lehr.

Upon support 62 there are mounted leaf springs 63 slanting upward and away from the lehr and having plate 13 mounted thereon. A rearwardly and downwardly extending rigid arm or bracket 65 terminates adjacent an electric vibrator 66 mounted upon a support 67 for adjustment about a pivot 68, the necessary adjustment being slight and being provided for by a slight play at 69 and being controlled by a screw 70. It will be seen that the vibrator imparts to plate 13 a vibratory movement of translation adapted to move ware thereover, even when the upper surface of the plate is horizontal.

To the discharge edge of plate 13 there is hinged at 71 the discharge lip 14, the other edge of which rests upon the lehr conveyor. The hinge may be of the piano type or other suitable type which avoids interrupting the continuity of the upper surface enough to interfere with proper movement of articles thereover. Each individual support 62 rests on a spring 77 and is vertically adjustable by a screw 78 to bring each section of plate 13 into proper relation to conveyor 10.

Lead wires to the electric vibrator coil are shown at 72, and receive power through a variable transformer 73, so that the vibrating force applied as well as the amplitude of the vibration may be varied. The change in speed required in normal operation may be made while the device is in operation by adjusting the transformer.

In the construction shown, the lehr roof 75 extends out over the discharge end of the carrying-in conveyor, and the end wall 76 extends downward nearly to the level of the conveyor so that the ware is within the heated chamber of the lehr as soon as it reaches the discharge section of the carrying-in conveyor, but the supports and operating parts for both the carrying-in conveyor and the vibrating platform are below and outside of the heated chamber of the lehr.

Because of the heat above plate 13, it is preferable to extend an arm some distance therefrom so that the electric vibrator may be removed from the heat, although cooling means may be provided if preferred.

But one plate 13 and its operating means has been described, but ordinarily there will be a plurality of these plates, each with its operating means, so that lips 14 may rest upon each portion of the lehr conveyor, even when that conveyor is not entirely level.

While an electric vibrator has been mentioned, it will be understood that any equivalent means for vibrating plate 13 may be utilized, and that other features may be changed in shape, size, arrangement, means of driving and so forth to suit various needs, conveniences or preferences, provided the essential features pointed out in the appended claims are utilized.

From the foregoing description the operation of the apparatus will be clear, but for convenience a brief description of the conveying operation will be given.

With the receiving end of the carrying-in conveyor properly adjusted, bottles or other glass articles are placed thereon in succession as discharged from the forming machine and are carried for any distance and in any direction that is necessary to position them on the discharge run of the conveyor across the end of the lehr. They are protected from further cooling by the lehr as soon as they enter the side thereof and are beneath cover 75 and within end wall 76. The receiving portion of the carrying-in conveyor may be adjusted vertically, if desired, to receive ware of different heights, or for any other purpose.

Assuming wiper 15 is in its left position as viewed in Figs. 1 and 3, it will be moved to the right and in so doing wipes off any glass articles on the run of the carrying-in belt over which it moves. Because of the angle of springs 63 and the action of the vibrator, plate 13 moves articles thereon to plate 14. In fact, the conveying action of plate 13 begins as soon as the leading edge of a piece of glassware rests thereon, so that it assists the wiper in completing the movement of the ware from the carrying-in conveyor.

When the wiper reaches the right limit of its travel, the spring of bumper 52 is compressed until holding device 54 yields and then snaps the clutch to its reverse position so that the direction of the screw and wiper is reversed. Like action takes place through the operation of bumper 53 when the wiper reaches its left limit, and so the wiping operation is continuously repeated.

The links of the lehr conveyor, as they turn around their sprocket wheel and into their upper run, swing upward and downward somewhat at the point where the discharge edge of lip 14 rests thereon. By hinging the lip to the vibrating plate the discharge edge of the lip is allowed to rest at all times directly upon the lehr conveyor, so that the movement of the ware from lip 14 to the lehr conveyor is rendered as smooth as possible, and the sectional construction of the vibrating conveyor and separate adjustment of the sections make it possible to produce even charging across the lehr, regardless of heat-warpage.

Preferably the speed of the lehr conveyor is so adjusted as to just take care of the production of ware, so that articles like bottles may be fed to the lehr in such close juxtaposition as to minimize any danger of their falling over. Whether spaced or not as placed upon plate 13, they are crowded up against the mass of ware in the lehr and on the discharge edge of lip 14, if the lehr conveyor is slowed sufficiently to allow of that action, and the vibrational forward urge allows them to seek any vacant path into the lehr so that the ware is packed completely across the lehr conveyor regardless of the exact spacing of the ware on the carrying-in conveyor, provided the speed of the lehr conveyor is properly adjusted to the amount of glassware delivered in a given interval. Of course, the lehr conveyor may be speeded up sufficiently to provide for space between the articles when desired, and ordinarily the lehr conveyor will be moved a little faster than is strictly necessary, as a small amount of space between some articles does no harm and when thus timed frequent adjustments are unnecessary and the time of annealing may remain constant.

It will be seen that the use of the carrying-in belt with universal joints makes it possible to receive the ware from the forming machine and carry it into the lehr regardless of the horizontal direction of its movement and with considerable variation between the level at which it is discharged from the former and the level of the lehr conveyor, without applying any friction to the ware or applying any deforming stress. It will be seen that the adjustable standards 24 make it possible to adjust the portion of the conveyor adjacent the glass machine so that the upper run moves substantially horizontally where it receives the glassware, then at an angle to the horizontal as it approaches the lehr, so that it reaches the right level at the lehr, and then again horizontally as it enters the lehr. The vibrating conveyor takes the ware from the carrying-in conveyor with a minimum of friction and stress and places it upright on the lehr conveyor.

In this way the ware is conveyed to and placed upon the lehr conveyor in proper position and without scoring friction or deforming stress.

Some possible variations in the various devices have been mentioned as the description proceeded, but it will be understood that other changes may be made within the scope of the appended claims.

What I claim is:

1. In glass annealing apparatus, a lehr, a conveyor in the lehr, a carrying-in conveyor comprising links united by universal joints and having an upper run presenting surfaces upon which glassware may stand, and a return lower run directly beneath the upper run, supports and guides for said upper run directing it from its receiving end towards the lehr in a direction other than perpendicular to the direction of movement of the conveyor in the lehr and guiding the discharge end of said upper run across the end of the lehr perpendicularly to the direction of movement of the lehr conveyor, means to transfer ware from said discharge end of said upper run to the lehr conveyor, said lehr comprising a roof and side walls that extend over, and enclose ware upon, said discharge end of the carrying-in belt, the lower run returning beneath the lehr, and supporting and operating means for said discharge end and said transfer means below and outside of said lehr.

2. Apparatus in accordance with claim 1 and said transfer means comprising a platform between said discharge end and said lehr conveyor and means to vibrate the platform to move ware thereon toward and onto the lehr conveyor.

3. In apparatus of the character described, an endless conveyor with an upper run, a platform adjacent the receiving end of said upper run, a lip hinged at one side to said platform and having its other side resting on said upper run, and means to give the platform vibratory movements of translation in a direction to convey material thereover towards the endless conveyor.

4. In glass annealing apparatus, a lehr, an endless conveyor within the lehr, a lip hinged at one side and having its other side resting upon the receiving end of said conveyor, and means to vibrate the hinge axis of the lip in a direction to move material thereover onto said conveyor.

5. Apparatus for annealing glass comprising a lehr, a lehr conveyor, a carrying-in conveyor carrying glassware transversely of the lehr at one end thereof and spaced from the lehr conveyor, a platform between and approximately on a level with the ware-supporting surfaces of the carrying-in conveyor and the lehr conveyor, means to adjust vertically the end of the platform next to the carrying-in conveyor, and means to give the platform a vibratory movement of translation to move ware thereon towards and onto the lehr conveyor.

6. Apparatus for annealing glass comprising a lehr, a lehr conveyor, a carrying-in conveyor carrying glassware transversely of the lehr at one end thereof and spaced from the lehr conveyor, a platform between and approximately on a level with the ware-supporting surfaces of the carrying-in conveyor and the lehr conveyor, said platform having a discharge lip hinged at one side to the main platform and resting at the other side on the lehr conveyor, and means to give the platform a vibratory movement of translation to move ware thereon towards and onto the lehr conveyor.

7. Apparatus for annealing glass comprising a lehr, a lehr conveyor, a carrying-in conveyor carrying glassware transversely of the lehr at one end thereof and spaced from the lehr conveyor, a platform between and approximately on a level with the ware-supporting surfaces of the carrying-in conveyor and the lehr conveyor, said platform being formed in a plurality of separate parallel sections across the lehr and separate means to give each section of the platform a vibratory movement of translation to move ware thereon towards and onto the lehr conveyor.

8. Apparatus for annealing glass comprising a lehr, a lehr conveyor, a carrying-in conveyor carrying glassware transversely of the lehr at one end thereof and spaced from the lehr conveyor, a platform between and approximately on a level with the ware-supporting surfaces of the carrying-in conveyor and the lehr conveyor, means to give the platform a vibratory movement of translation to move ware thereon towards the lehr conveyor and a plurality of separate discharge lips across the lehr, each lip being hinged to vibrating means at its receiving edge and having its delivery edge resting on the lehr conveyor and bridging the distance between the vibrating platform and the lehr conveyor.

9. Apparatus for annealing glass comprising a lehr, a lehr conveyor, a carrying-in conveyor carrying glassware transversely of the lehr at one end thereof and spaced from the lehr conveyor, a platform between and approximately on a level with the ware-supporting surfaces of the carrying-in conveyor and the lehr conveyor, means to give the platform a vibratory movement of translation to move ware thereon towards and onto the lehr conveyor and means to push the ware from the carrying-in conveyor to the vibrating platform, said pushing means comprising a wiper and means to reciprocate the wiper longitudinally of the carrying-in conveyor, said last named means being geared to move the wiper with the conveyor at the same speed as the conveyor and to move it in the opposite direction more slowly.

10. Apparatus for annealing glass comprising a lehr, a lehr conveyor, a carrying-in conveyor carrying glassware transversely of the lehr at one end thereof and spaced from the lehr conveyor, a platform between and approximately on a level with the ware-supporting surfaces of the carrying-in conveyor and the lehr conveyor, and means to give the platform a vibratory movement of translation to move ware thereon towards and onto the lehr conveyor, said vibrating means comprising an arm extending from said platform away from the lehr conveyor and carrying an armature, a coil adapted to be energized by an alternating current, and an adjustable means for positioning the coil in adjustable relation to the armature.

11. Apparatus for annealing glass comprising a lehr, a lehr conveyor, a carrying-in conveyor carrying glassware transversely of the lehr at one end thereof and spaced from the lehr conveyor, a platform between and approximately on a level with the ware-supporting surfaces of the carrying-in conveyor and the lehr conveyor, parallel leaf springs supporting the platform, fixed at their lower ends and slanting upwards and backwards toward the carrying-in conveyor and attached to the platform at their upper ends and means to vibrate the platform on such springs.

12. Apparatus for annealing glass comprising a lehr, a lehr conveyor, a carrying-in conveyor carrying glassware transversely of the lehr at one end thereof and spaced from the lehr conveyor, a platform between and approximately on a level with the ware-supporting surfaces of the carrying-in conveyor and the lehr conveyor, parallel leaf springs supporting the platform, fixed at their lower ends, slanting upwards and backwards toward the carrying-in conveyor and attached to the platform at their upper ends, means to vibrate the platform on such springs, and means to adjust the amplitude of the vibrations of the platform.

13. Apparatus for annealing glass comprising a lehr, a lehr conveyor, a carrying-in conveyor carrying glassware transversely of the lehr at one end thereof and spaced from the lehr conveyor, a platform between and approximately on a level with the ware-supporting surfaces of the carrying-in conveyor and the lehr conveyor, parallel leaf springs supporting the platform, fixed at their lower ends, slanting upwards and backwards toward the carrying-in conveyor and attached to the platform at their upper ends and means to vibrate the platform on such springs, said vibrating means comprising an electric vibrator and an arm extending from the platform to the vibrator in a direction away from the lehr.

ALBERT F. TREMBLAY.

REFERENCES CITED

The following references are of record in the file of this patent:

UNITED STATES PATENTS

| Number | Name | Date |
| --- | --- | --- |
| 1,148,005 | Bogdanffy | July 27, 1915 |
| 1,424,850 | Purcell | Aug. 8, 1922 |
| 1,501,602 | Holmes | July 15, 1924 |
| 1,509,063 | Johnson | Sept. 16, 1924 |
| 1,538,248 | La France | May 19, 1925 |
| 1,624,250 | Johnson et al. | Apr. 12, 1927 |
| 1,637,714 | Slick | Aug. 2, 1927 |
| 1,817,373 | Hopkins | Aug. 4, 1931 |
| 1,833,951 | Morton et al. | Dec. 1, 1931 |
| 1,883,362 | Freese | Oct. 18, 1932 |
| 2,008,572 | White | July 16, 1935 |
| 2,094,787 | Flint | Oct. 5, 1937 |